United States Patent
Holtgrewe et al.

(10) Patent No.: US 10,179,832 B2
(45) Date of Patent: Jan. 15, 2019

(54) STORAGE STABLE HEAT ACTIVATED QUATERNARY AMMONIUM CATALYSTS FOR EPOXY CURE

(71) Applicant: Henkel AG & Co. KGaA, Duesseldorf (DE)

(72) Inventors: Christian Holtgrewe, Duesseldorf (DE); Pablo Walter, Munich (DE); Thomas Bachon, Duesseldorf (DE); Rainer Schoenfeld, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 137 days.

(21) Appl. No.: 15/293,864

(22) Filed: Oct. 14, 2016

(65) Prior Publication Data

US 2017/0029558 A1 Feb. 2, 2017

Related U.S. Application Data

(63) Continuation of application No. PCT/EP2015/058167, filed on Apr. 15, 2015.

(30) Foreign Application Priority Data

Apr. 15, 2014 (EP) .................. 14164793

(51) Int. Cl.
| | |
|---|---|
| *C08G 59/68* | (2006.01) |
| *B01J 31/02* | (2006.01) |
| *B01J 31/26* | (2006.01) |
| *C08G 59/18* | (2006.01) |
| *C08G 59/40* | (2006.01) |
| *C08K 5/19* | (2006.01) |
| *C08G 59/24* | (2006.01) |
| *C09J 163/00* | (2006.01) |

(52) U.S. Cl.
CPC ........ *C08G 59/686* (2013.01); *B01J 31/0212* (2013.01); *B01J 31/0239* (2013.01); *B01J 31/26* (2013.01); *C08G 59/182* (2013.01); *C08G 59/184* (2013.01); *C08G 59/245* (2013.01); *C08G 59/4014* (2013.01); *C08G 59/4092* (2013.01); *C08K 5/19* (2013.01); *B01J 2231/14* (2013.01); *C09J 163/00* (2013.01)

(58) Field of Classification Search
CPC .... B01J 31/0212; B01J 31/0239; B01J 31/26; B01J 2231/14; C08G 59/686; C08G 59/182; C08G 59/184; C08G 59/4014; C08G 59/4092; C08G 59/245; C08K 5/19; C09J 163/00
USPC .......................................................... 528/87
See application file for complete search history.

(56) References Cited

U.S. PATENT DOCUMENTS

| | | | |
|---|---|---|---|
| 2,928,809 A | 3/1960 | Hicks | |
| 4,507,376 A | 3/1985 | Makita et al. | |
| 4,670,533 A * | 6/1987 | Lauterbach | ........ C08G 59/4021 525/113 |
| 5,902,835 A * | 5/1999 | Meier | .................. C08G 18/163 521/125 |
| 6,335,304 B1 | 1/2002 | He et al. | |
| 8,247,517 B2 | 8/2012 | Wittenbecher et al. | |
| 8,779,036 B2 | 7/2014 | Spyrou et al. | |
| 2004/0018938 A1 | 1/2004 | Eng et al. | |
| 2007/0249484 A1 | 10/2007 | Benkhoff et al. | |
| 2010/0280191 A1 | 11/2010 | Dixit et al. | |

FOREIGN PATENT DOCUMENTS

| | | | |
|---|---|---|---|
| GB | 1377887 | 12/1874 | |
| GB | 855205 | 11/1960 | |
| JP | 2000212257 | 8/2000 | |
| JP | 2002308967 | 10/2002 | |
| JP | 3517240 B2 * | 4/2004 | ........... C07C 211/64 |
| WO | 96/01481 | 1/1996 | |
| WO | 2008/152011 | 12/2008 | |
| WO | 2010/124901 | 11/2010 | |
| WO | 2012/006001 | 1/2013 | |

OTHER PUBLICATIONS

Hiroo et al., JP 3517240 B2 machine translation in English, Apr. 12, 2004 (Year: 2004).*
International Search Report issued in connection with International Patent Application No. PCT/EP2015/058167 dated Jul. 22, 2015.
(Continued)

*Primary Examiner* — David T Karst
(74) *Attorney, Agent, or Firm* — Steven C. Bauman

(57) ABSTRACT

The present invention relates to a catalyst composition for curing epoxy group containing compounds comprising a base and a quaternary ammonium salt, of Formula (I):

Formula (I)

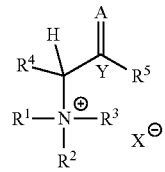

with $R^1$, $R^2$, $R^3$, $R^4$, $R^5$, Y, A and X being as defined herein. Also encompassed are adhesive compositions containing said catalyst composition and the use of the catalyst composition.

13 Claims, No Drawings

(56) References Cited

OTHER PUBLICATIONS

Cationic Cure of Epoxy Resin Initiated by Methylanilinium, Salts as a Latent Thermal Initiator, Soo-Jin Park, Taek-Jin Kim, Jae-Rock Lee, Journal of Poymer Science; Part B: Polymer Physics, vol. 39, 2397-2406 (2001).
Cationic Polymerisation of Glycidyl Phenyl Ether by Benzylammonium Salt, S. Nakano, T. Endo, J. Poly. Sci. Part A, 1995, 33, 505-512.
Novel Quaternary Ammonium Borates as Latent Catalysts for Epoxy-Phenolic Resins, Yoshiyuki Goh, Takao Iljima, Masao Tomoi, J. Poly. Sci. Part A, 2002, 40, 2689.

\* cited by examiner

STORAGE STABLE HEAT ACTIVATED QUATERNARY AMMONIUM CATALYSTS FOR EPOXY CURE

The present invention relates to a catalyst composition for curing epoxy group containing compound comprising a base and a quaternary salt, the use of such catalyst composition as well as a dispensing system comprising the catalyst as described herein and an epoxy resin.

Low curing temperatures are desired for many applications where one component epoxy adhesives are used. Low curing temperatures are desirable as they save energy as well as reduce thermal impact on the substrates. Additionally, thermal stresses due to different heat speed or thermal elongation of the substrates can be minimized. Lower temperatures however need higher reactive hardeners which in general do not have sufficient storage stability in one component formulations. Consequently, there is a need for catalyst compositions for epoxy cure which are effective at low temperatures and still provide for high storage stability.

The present invention meets this object and is based on the inventors' surprising finding that a catalyst composition comprising a base and a quaternary ammonium salt, wherein the quaternary ammonium is represented by Formula (I), provide faster curing, higher storage stability, and better adhesion than commercially available dicyandiamide (DICY) curatives.

In a first aspect, the present invention relates to a catalyst composition for the curing of an epoxy group containing compound comprising:
a base; and
a quaternary ammonium salt, wherein the quaternary ammonium salt is represented by Formula (I):

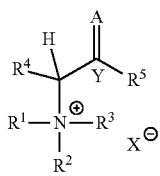

Formula (I)

wherein
$R^1$, $R^2$ and $R^3$ are independently from each other selected from the group consisting of linear or branched, substituted or unsubstituted alkyl with 1 to 20 carbon atoms, linear or branched, substituted or unsubstituted alkenyl with 3 to 20 carbon atoms, linear or branched, substituted or unsubstituted alkoxy with 1 to 20 carbon atoms or substituted or unsubstituted aryl with 6 to 20 carbon atoms; two of $R^1$, $R^2$ and $R^3$ may combine to form together with the nitrogen atom to which they are attached a substituted or unsubstituted 5- to 10-membered ring;
$R^4$ is selected from the group consisting of hydrogen, linear or branched, substituted or unsubstituted alkyl with 1 to 20 carbon atoms, linear or branched, substituted or unsubstituted alkenyl with 3 to 20 carbon atoms, linear or branched or substituted or unsubstituted aryl with 6 to 20 carbon atoms;
Y is C or $N^+$, provided that if Y is $N^+$, A is O and $R^5$ is $O^-$;
A is O or $CR^6R^7$;
$R^5$ is selected from the group consisting of hydrogen, —OH, linear or branched, substituted or unsubstituted alkyl with 1 to 20 carbon atoms, linear or branched, substituted or unsubstituted alkenyl with 3 to 20 carbon atoms, linear or branched, substituted or unsubstituted alkoxy with 1 to 20 carbon atoms, substituted or unsubstituted aryl with 6 to 20 carbon atoms, or, if Y is $N^+$ and A is O, $R^5$ is $O^-$;
$R^6$ and $R^7$ are independently from each other selected from the group consisting of hydrogen, halogen, nitro, —NRR', cyano, —C(O)R, —C(O)OR, —(CO)NRR', —NR'C(O)R, —OC(O)R, linear or branched, substituted or unsubstituted alkyl with 1 to 20 carbon atoms, linear or branched, substituted or unsubstituted alkenyl with 3 to 20 carbon atoms, linear or branched, substituted or unsubstituted alkoxy with 1 to 20 carbon atoms, substituted or unsubstituted aryl with 6 to 20 carbon atoms; or
$R^5$ and $R^6$ may combine to form together with the carbon atoms to which they are attached a substituted or unsubstituted 5- to 10-membered cycloalkenyl, heteroalicyclic, aryl or heteroalyl ring;
R and R' are independently selected from H, alkyl with 1 to 20 carbon atoms, alkenyl with 2 to 20 carbon atoms, alkynyl with 2 to 20 carbon atoms, aryl with 6 to 14 carbon atoms, cycloalk(en)yl with 3 to 8 carbon atoms, 5- to 14-membered heteroaryl, comprising 1 to 4 heteroatoms selected from N, O, and S, and 5- to 14-membered heterocycloalk(en)yl, comprising 1 to 4 heteroatoms selected from N, O, and S; and
X is any anion.

It has been found that quaternary ammonium salts bearing a nitro, carbonyl or vinyl group in the β-position relative to the ammonium nitrogen rearrange upon heating to yield NH-ammonium salts. Combined with non-coordinating anions, these salts are able to cure epoxy cationically. When formulating the ammonium salts with an appropriate (liquid) base the respective tertiary amines are released from the NH-ammonium salts. These amines can either directly cure epoxy resins themselves or function as accelerators for common hardening agents, such as dicyandiamide. For curing epoxy with the ammonium salts alone, however, high amounts are necessary which can significantly reduce the storage stability. Nevertheless, by using those salts low curing temperatures of about 120° C. can be achieved. Generally, the proposed systems yield better adhesive performance compared to commonly used systems. A further advantage of the present invention are low curing temperatures and short curing times that are achievable by the combination of the described unsaturated ammonium salts with known hardening agents, such as dicyandiamide. Compared to the industry standard dicyandiamide accelerators Fenorun and UR 700, the curing temperature could be reduced about 30° C. or 30 minutes at 120° C. At the same time compared to the industry standard the ammonium salt/base system exhibits higher stability at 50° C. in unmodified epoxy resins.

In a second aspect, the present invention is directed to the use of a catalyst composition as described herein for the curing of epoxy resins, wherein the epoxy resins preferably have 1 to 10 epoxy groups and are selected from the group consisting of diglycidyl ethers of resorcinol, catechol, hydroquinone, bisphenol, bisphenol A, bisphenol AP (1,1-bis (4-hydroxylphenyl)-1-phenyl ethane), bisphenol F, bisphenol K, bisphenol M, bisphenol S, tetramethylbiphenol, diglycidyl ethers of alkylene glycols with 2 to 20 carbon atoms and poly(ethylene oxide) or poly(propylene oxide); polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof, preferably diglycidyl ethers of bisphenol F and diglycidyl ethers of bisphenol A and any combination thereof.

"At least one", as used herein, relates to at least one and comprises 1, 2, 3, 4, 5, 6, 7, 8, 9 or more of the referenced species.

In various embodiments, the quaternary ammonium salt is represented by Formula (II)

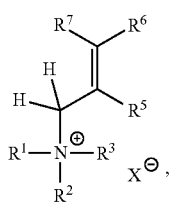

Formula (II)

wherein
$R^1$, $R^2$, $R^3$, $R^5$, $R^6$, $R^7$ and X are as defined above.

In various embodiments, the quaternary ammonium salt is represented by Formula (III):

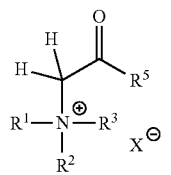

Formula (III)

wherein
$R^1$, $R^2$, $R^3$, $R^5$ and X are as defined above.

In various embodiments, $R^1$, $R^2$ and/or $R^3$ are methyl or ethyl, preferably ethyl.

In various embodiments, $R^4$ is hydrogen.

As described above, $R^1$, $R^2$, $R^3$, $R^5$, $R^6$, and $R^7$ can be substituted alkyl with 1 to 20 carbon atoms, alkenyl with 3 to 20 carbon atoms, alkoxy with 1 to 20 carbon atoms, and aryl with 6 to 20 carbon atoms. Two of $R^1$, $R^2$ and $R^3$ may combine to form together with the nitrogen atom to which they are attached a substituted or unsubstituted 5- to 10-membered ring. But in a preferred embodiment $R^1$, $R^2$ and $R^3$ are not combined to a ring. Furthermore, $R^5$ and $R^6$ may combine to form together with the carbon atoms to which they are attached a substituted 5- to 10-membered cycloalkenyl, heteroalicyclic, aryl or heteroaryl ring. When the above groups are substituted, they can be substituted with one or more substituents independently selected from the group consisting of —OR, halogen, nitro, —NRR', cyano, —C(O)R, —C(O)OR, —(CO)NRR', —NR'C(O)R, —OC(O)R, aryl with 5 to 20 carbon atoms, cycloalk(en)yl with 3 to 20 carbon atoms, 3- to 8-membered heterocycloalk(en)yl, and 5- to 20-membered heteroaryl, wherein R and R' are as defined above, i.e. are independently selected from H, alkyl with 1 to 20 carbon atoms, alkenyl with 2 to 20 carbon atoms, alkynyl with 2 to 20 carbon atoms, aryl with 6 to 14 carbon atoms, cycloalk(en)yl with 3 to 8 carbon atoms, 5- to 14-membered heteroaryl, comprising 1 to 4 heteroatoms selected from N, O, and S, and 5- to 14-membered heterocycloalk(en)yl, comprising 1 to 4 heteroatoms selected from N, O, and S.

In a preferred embodiment of the present invention, $R^5$ to $R^7$ of the ammonium compound according to Formula (II) are independently from each other selected from the group consisting of hydrogen or linear or branched, substituted or unsubstituted alkyl with 3 to 10 carbon atoms. In one preferred embodiment, $R^5$, $R^6$ and $R^7$ are hydrogen. In still another preferred embodiment, $R^5$ and $R^7$ are hydrogen and $R^6$ is —C(O)OR, with R being $C_1$-$C_{20}$ alkyl, preferably ethyl. In a still further preferred embodiment, $R^5$ and $R^6$ combine to form together with the carbon atoms to which they are attached an aromatic (poly)ring system, preferably a phenyl ring. The aromatic ring may be substituted or unsubstituted. The substitution may be in the 4'-position or in the 2'-position and may be a group selected from halogen, such as chloro or bromo, or nitro. Exemplary quaternary ammonium compounds of Formula (II) contemplated herein include, but are not limited to triethylallyl ammonium, triethylbenzyl ammonium, triethyl (4-bromo-benzyl) ammonium, triethyl (4-nitro-benzyl) ammonium, and triethyl (4-crotonic acid ethyl ester)ammonium with X being any anion, preferably bromide or hexafluoroantimonate.

In another preferred embodiment of the present invention, $R^5$ of the ammonium compound according to Formula (III) is independently selected from the group consisting of substituted or unsubstituted phenyl or $C_{1-20}$ alkoxy, preferably $C_{1-4}$ alkoxy, more preferably ethoxy. Exemplary quaternary ammonium compounds of Formula (III) contemplated herein include, but are not limited to triethyl (2-phenylethan-2-one) ammonium, triethyl (4-nitro-2-phenylethan-2-one) ammonium, triethyl (4-chloro-2-phenylethan-2-one) ammonium, and triethyl (2-acetic acid ethyl ester)ammonium, with X being any anion, preferably bromide or hexafluoroantimonate.

In various embodiments of the present invention, the base is selected from the group consisting of metal alkoxides, such as titanium tetrabutoxide, titanium tetraisopropoxide, sodium methoxide and sodium ethoxide; aqueous NaOH, KOH, $Ca(OH)_2$, $Na_2CO_3$, $Na_3PO_4$ and combinations thereof. Furthermore, the base can be any base which is capable to deprotonate the $CH_2$ group next to the quaternary nitrogen atom. The base can be a liquid base.

In various embodiments, X can be any anion. For example and without limitation, X can be selected from the group consisting of dicyandiamide-anion, $F^-$, $Cl^-$, $Br^-$, $I^-$, $OH^-$, $HSO_3^-$, $SO_3^{2-}$, $SO_4^{2-}$, $NO_2^-$, $NO_3^-$, $PO_4^{3-}$, $BF_4^-$, $PF_6^-$, $SbF_6^-$, $ClO_4^-$, acetate, citrate, formiate, glutarate, lactate, malate, malonate, oxalate, pyruvate, and tartrate. Preferably X is a non-coordinating anion selected from the group consisting of $F^-$, $Cl^-$, $Br^-$, $I^-$, $OH^-$, $HSO_3^-$, $SO_3^{2-}$, $SO_4^{2-}$, $NO_2^-$, $NO_3^-$, $PO_4^{3-}$, $BF_4^-$, $PF_6^-$, $SbF_6^-$, $ClO_4^-$ and acetate. Without wishing to be bound to any particular theory, it is believed that catalyst compositions as described herein comprising one or more non-coordinating anions are particularly effective for curing epoxy resins cationically. In all embodiments, where the ammonium compounds disclosed herein function as an accelerator for a known hardening agent, such as dicyandiamide, which are described in more detail below, the known hardening agent can be the anion.

Preferred combinations of ammonium compound, anion and base include, but are not limited to: triethylallyl ammonium bromide and titanium tetrabutoxide; triethylallyl ammonium bromide and titanium tetraisopropoxide; triethylallyl ammonium bromide and Na methoxylate; triethyl-(2-phenylethan-2-one) ammonium bromide and titanium tetraisopropoxide; triethyl-(4-chloro-2-phenylethan-2-one) ammonium bromide and titanium tetraisopropoxide; triethylbenzyl ammonium bromide and titanium tetraisopropoxide; triethyl 4-bromo-benzyl ammonium bromide and titanium tetraisopropoxide; triethyl 4-nitro-benzyl ammonium bromide and titanium tetraisopropoxide; triethylallyl ammonium hexafluoroantimonate and titanium tetraisopropoxide; triethyl-(4-chloro-2-phenylethan-2-one) ammonium hexafluoroantimonate and titanium tetraisopropoxide; triethyl-(4-nitro-2-phenylethan-2-one) ammonium hexafluoroantimonate and titanium tetraisopropoxide; triethylbenzyl ammonium hexafluoroantimonate and titanium tetraisopropoxide; triethyl 4-bromo-benzyl ammonium hexafluoroantimonate and titanium tetraisopropoxide; triethyl (2-acetic acid ethyl ester)ammonium bromide and titanium tetraisopropoxide; triethyl (2-acetic acid ethyl ester)ammonium hexafluoroantimonate and titanium tetraisopropoxide; triethyl (4-crotonic acid ethyl ester) ammonium bromide and titanium tetraisopropoxide; and triethyl (4-crotonic acid ethyl ester)ammonium hexafluoroantimonate and titanium tetraisopropoxide.

In various embodiments of the present invention, the catalyst composition as described herein further comprises at least one known hardening agent (or curing agent). Curing agents that may be used include, but are not limited to thermally-activated hardener or latent curing agents, such as guanidines, substituted guanidines, substituted ureas, melamine resins, guanamine derivatives, cyclic tertiary amines, aromatic amines and/or mixtures thereof. Preferred substituted guanidines include Methylguanidine, Dimethylguanidine, Trimethylguanidine, Tetramethylguanidine, Methyl-iso-biguanidines, Dimethyl-iso-biguanidines, Tetramethyl isobiguanidine, Hexamethyl-iso-biguanidines, Heptamethyl-iso-biguanidines and Cyanoguanidines (Dicyandiamide), with dicyandiamide being especially preferred. Preferred guanamines are alkylated benzoguanamine, benzoguanamine or methoxymethylethoxymethylbenzoguanamine. Dicyandiamide, as the most preferred hardener, is for example commercially available under the trademark name Dyhard 100SH. Modified polyamines include those commercially available under the trademark name Ancamine 2014FG. In such embodiments, where a known curing agent is included, the ammonium compounds disclosed herein function as accelerators for the hardening agent.

In various other embodiments, the catalyst compositions described herein may additionally comprise other commercially available accelerators, in particular in those embodiments where a known hardening agent is included. Known and widely used accelerators that may be used in accordance with this aspect of the invention, include known accelerators for dicyandiamide, such as urea derivatives, including, but not limited to Fenuron (UR300; 3-phenyl-1,1-dimethyl urea) and UR 700, and imidazole derivatives, such as 2-Methylimidazoleazine, commercially available under the trademark name Curezol 2MZ Azine, and mixtures thereof. Other ureas that may be used include p-chlorophenyl-N,N-dimethylurea (monuron), or 3,4-dichlorophenyl-N,N-dimethylurea (diuron). Various other suitable imidazole derivatives, preferably solid imidazole derivatives, include 2-ethyl-2-methylimidazole, N-butylimidazole, benzimidazole and N—$C_{1-12}$-alkylimidazoles or N-arylimidazoles.

The catalyst compositions described herein may be used for the curing of various epoxy resins, and may thus be also termed "hardening composition" or "curing composition". The epoxy resins cured with the catalyst compositions described herein may include any commonly known and used epoxy resin. Suitable epoxy resins preferably include epoxy resins with 1 to 10 epoxy groups per molecule. These epoxy groups can be 1,2-epoxy groups. The epoxy resin can in principle be a saturated, unsaturated, cyclic or acyclic, aliphatic, alicyclic, aromatic or heterocyclic polyepoxide compound. Examples of suitable epoxy resins include polyglycidyl ethers, commonly prepared by reacting epichlorohydrin or epibromohydrin with a polyphenol in the presence of alkali as well as polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins. Polyphenols suitable for this purpose include, for example, resorcinol, pyrocatechol, hydroquinone, bisphenol A (2,2-bis(4-hydroxyphenyl)propane), bisphenol F (bis(4-hydroxy-phenyl)methane), 1,1-bis(4-hydroxyphenyl)isobutane, 4,4'-dihydroxybenzophenone, 1,1-bis(4-hydroxyphenyl)-ethane, 1,5-hydroxynaphthalene. Likewise suitable are diglycidyl ethers of ethoxylated resorcinol (DGER), e.g., from Indspec Chemical Corporation, and diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbiphenol; diglycidyl ethers of alkylene glycols with 2 to 20 carbon atoms and poly(ethylene oxide) or poly(propylene oxide) glycols.

Additional suitable epoxy resins are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Still other suitable epoxy resins are polyglycidyl esters of polycarboxylic acids, examples being reaction products of glycidol or epichlorohydrin with aliphatic or aromatic polycarboxylic acids such as oxalic acid, succinic acid, glutaric acid, terephthalic acid or dimer fatty acid.

Further suitable epoxy resins are derived from the epoxidation products of olefinically unsaturated cycloaliphatic compounds or from natural oils and fats.

In preferred embodiments, the cured epoxy resins have 1 to 10 epoxy groups and are selected from the group consisting of diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbiphenol, diglycidyl ethers of alkylene glycols with 2 to 20 carbon atoms and poly(ethylene oxide) or poly(propylene oxide); polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof, preferably diglycidyl ethers of bisphenol F and diglycidyl ethers of bisphenol A and any combination thereof.

Particular preference is given to the epoxy resins which are derived from the reaction of bisphenol A or bisphenol F and epichlorohydrin. In this case it can be advantageous to use mixtures of liquid and solid epoxy resins, the liquid epoxy resins preferably being based on bisphenol A and having a sufficiently low molecular weight. The epoxy resins which are liquid at room temperature generally have an epoxide equivalent weight of from 150 to about 220; particular preference is given to an epoxy equivalent weight range of from 182 to 192.

The epoxy resin may additionally comprise a further modified epoxy resin which gives the cured bond improved impact strength and low-temperature properties. Modified epoxy resins of this kind are known per se, and comprise reaction products of epoxy resins having an epoxy functionality greater than 1 with carboxy functional rubbers, dimer fatty acids or core/shell polymers whose cores have glass transition temperatures of below −30° C. The epoxy resin in this case is preferably employed in a stoichiometric excess and produces an epoxy functional reaction product. The excess of epoxy resin may be well beyond the stoichiometric excess. Epoxy functionality greater than 1 for the epoxy resin means in this case that the compounds contain more than 1, preferably at least 2, 1,2-epoxy groups per molecule. For these modified epoxy resins it is preferred to use epoxy resins with an epoxide equivalent of between 150 and 4000. In the same way as with the aforementioned carboxy functional modifiers, the modified epoxy resins which can be used can be obtained by reacting low-molecular weight epoxy resins having an epoxy functionality greater than 1 with amino-terminated polyethers, alkyl- , aryl- or alkylarylamines with a functionality of two or more, likewise in a stoichiometric excess.

In various embodiments, at least a part of the epoxy resin may be modified, for example with a co-polymer of a 1,3-diene and a polar ethylenically unsaturated co-monomer and/or core-shell particles (CSR core-shell rubber). In a further preferred embodiment, the content of the modified co-polymer epoxy resin and/or core-shell particles (CSR; core shell rubber) is between 5 to 60 wt.-%, preferably between 5 to 40 wt.-%, particularly preferably between 8 to 30 wt.-%, most preferably between 10 to 25 wt.-% relative to the epoxy resins used. Preferred copolymers include carboxy terminated butadiene acrylonitrile rubbers, such as Hycar CTBN 1300X8, 1300X13 and 1300X31. The coreshell particles commonly have a size from 0.03 to 50 µm, particularly preferably 1 to 20 µm, and most preferably less than 5 µm. Typically, core-shell particles have an average diameter of only even 500 nm or less than 200 nm, such as from 25 to 200 nm or from 50 to 150 nm. Preferably, the core material of a CSR is of a diene homopolymer or copolymer with elastomeric properties, such as a homopolymer of butadiene or isoprene, a copolymer of butadiene or isoprene with one or more ethylenically—unsaturated monomer(s), such as vinyl-aromatic monomer(s), (meth) acrylonitrile and/or (meth) acrylate. Preferred polymers as core material are selected from polybutadiene, polybutyl acrylate, polydimethylsiloxane, polyacrylates, polymethacrylates, poly (meth)acrylic acid and their co- or terpolymers, polyacrylonitrile or polysulfide, very particularly preferably from polybutadiene, polydimethylsiloxane or polybutylacrylate. As shell material a polymer or a copolymer with nonelastomeric properties is preferably (preferably a thermoplastic or thermosetting/crosslinking polymer) used. Preferred polymers as a shell material are selected from, for example, polystyrene, poly(meth)acrylamide, polyacrylonitrile, polyacrylate and -methacrylat, a styrene/acrylonitrile/ glycidyl methacrylate polymer, or of a polymer or a copolymer of one or more monomers of unsaturated acids and anhydrides (e.g., acrylic acid).

Said core-shell rubber particles can be used as a toughener. In this case, in addition to the diene homopolymers and copolymers already mentioned above, elastomeric polysiloxanes such as polydimethylsiloxane and crosslinked polydimethylsiloxane are suitable as core material. The polysiloxane may be used as the core material alone or in combination with other polymer forming the core. Suitable CSRs are, for example, commercially available from Wacker under the trade name Genioperl, which include the products Genioperl P22, P23, P52 and P53, or from Dow Chemical under the trade name Paraloid/Paraloid. Furthermore, core-shell rubber particles sold under the trade name DEGALAN with Degalan 4899F (Roehm GmbH or Roehm America, Inc.) or from Aica Kogyo under the trade name Zefiac F351 available from General Electric under the trade name Blendex are suitable.

As mentioned above, a part of the epoxy resin having core-shell particles may be modified. In this case, the (polymer) composition that constitutes the shell has a sufficient affinity for the epoxy resin, so that the resulting CSR is in the form of primary particles, which exist stably dispersible in epoxy resin. Such CSRs are commercially available from Kaneka and are in the form of phase separated particles which are dispersed in epoxy resins. These particles have a core of a copolymer of (meth) acrylatebutadiene-styrene, where butadiene is the primary component of the copolymer of the core. Other commercially available masterbatches of core-shell rubber particles dispersed in epoxy resins include Genioperl M23A from Wacker (are a dispersion of 30 wt.-% CSR in an aromatic epoxy resin, which is based on bisphenol A diglycidyl ether, with the CSR having an average diameter of about 100 nm and containing a crosslinked silicone elastomer core onto which an epoxy-functional acrylate copolymer has been grafted) or Fortegra 301 from Dow.

Typically, an adhesive composition includes from about 5 to 25 wt.-%, preferably 8 to 20 wt.-% CSR. Mixtures of different CSR (with different particle size, glass transition temperatures, core polymer shell polymer) can of course be used.

The ratio of epoxy resin to tougheners (for example, epoxy-based prepolymer) and CSR may preferably be not less than 0.2:1 and not more than 3:1 (preferably 0.5:1 to 2,5:1 or 0.5:1 to 2:1, or from 0.5 to 1.5:1). The ratio of tougheners (epoxy-based prepolymer) : CSR is preferably not less than 0.2:1 and not more than 5:1 (preferably 0.5:1 to 3:1 or 1:1 to 3:1 or 0.5:1 to 2:1).

In addition to CSR or as a substitution for CSR, an adhesive composition may include other tougheners. Suitable tougheners include polymers and oligomers having a glass transition temperature of below 20° C. (preferably less than 0° C. or below −30° C. or −50° C.) with reactive functional groups selected from epoxy, carboxy acid, amino and/or hydroxyl groups which are able to react with other compounds contained in the adhesive composition by curing. Suitable compounds are known to those skilled in the art. Tougheners like epoxy-based prepolymers are especially preferred. Preferably, diglycidyl ethers of polyphenols such as bisphenol A and bisphenol F and epoxy resins are used. Alternatively, epoxy-based, hydroxyl group-containing amphiphilic block copolymers, such as those available under the trademark name Fortegra® from Dow (The Dow Chemical Company) can be used.

The catalyst compositions described herein can be combined with the above-described epoxides and tougheners in form of an adhesive composition. Such adhesive compositions can comprise numerous other components, all of which are well known to those skilled in the art, including but not limited to commonly used adjuvants and additives such as, for example, fillers, plasticizers, reactive and/or non-reactive diluents, flow agents, coupling agents (e.g. silanes), adhesion promoters, humectants, tackifiers, flame retardants, wetting agents, thixotropic and/or rheology agents (e.g., fumed silica) aging and/or corrosion inhibitors, stabilizers and/or coloring agents.

The afore-mentioned additives and auxiliaries may be combined with the ammonium compounds of the invention in a catalyst or curing composition which does not contain the to-be-cured epoxy resins or, alternatively or additionally, may be combined with the to-be-cured resin composition, or may be combined with both, i.e. the to-be-cured resins and the curing composition in form of a one component adhesive.

Based on the requirements of the adhesive and its application and in view of the production, flexibility, strength, and adhesive bonding to the substrate, the auxiliaries and additives are incorporated in varying amounts in the composition.

Suitable adhesion promoters that may be used in the above-described compositions include, for example, one or more reaction products of epoxy resins with compounds having chelating functional groups (so-called "chelate-modified epoxy resins"). The chelating functional groups include those functional groups that are capable of forming chelate bonds with divalent or polyvalent metal atoms, either by themselves or with other functional groups, which are also positioned in the molecule. Suitable chelating functional groups include phosphonic acid groups (e.g. —PO(OH)$_2$), carboxylic acid groups (—COOH), sulfonic acid groups (—SO$_3$H), amino groups, and hydroxyl groups (particularly hydroxyl groups adjacent to an aromatic ring). Such reaction products of epoxy resins and components having chelating functional groups, are for example commercially available under the product names ADEKA Resins EP-4910N, EP-49-55C, EP-49-10, EP49-20, EP-49-23, and EP-49-25 (Asahi Denka). Typical compositions contain 0.1 wt.-% to 3 wt.-% chelate-modified epoxy resins based on the total preparation. Also suitable for use as adhesion promoters are acetoacetate-functionalized modified resins, which are available under the trade name K-Flex XM B301von King Industries.

The inventive composition may further contain reactive diluents, preferably mono-epoxides, such as monoglycidyl ethers of alkyl-and alkenyl-substituted phenols. In general the composition contains such diluents in amounts of up to 15 wt.-%, preferably from 0.5 to 10 wt.-%, based on the total amount of the composition.

The catalyst composition according to the present invention can be used to cure epoxy resins at a temperature from about 50° C. to about 180°, about 90° C. to about 150° C., preferably at about 120° C.

"About", as used herein in relation to a numeric value, refers to the referenced value ±10% of said numeric value.

Furthermore, the catalyst composition as described herein can be used in amounts of 40 to 80 wt. %, based on the total weight of the epoxy resins/catalyst reaction mixture to cure epoxy resin.

Dispensing can be accomplished using simple manual dispensing units or fully automated systems. Such systems are marketed, for example, under the Loctite trademark. Examples of such automated systems are volumetric double gear pumps, double precision piston dispensers, double screw pump dispensers, or drum pump systems.

EXAMPLES

Stability Test as Accelerator for Dicyandiamide

To a suspension of 20 g of a Bisphenol-A-diglycidylether (DER 331 from Dow), 1.4 g of dicyandiamide (Dyhard 100SH from Alz Chem) and 0.06 g of the tested ammonium salt, an amount of titanium tetraisopropoxide (Alfa Aesar) equimolar to the ammonium salt was added. The compositions were mixed in a vacuum speed mixer (Thinky AVR 310) for one minute at 2000 rpm and a vacuum below 50 mbar. For the comparative examples 20 g of a Bisphenol-A-diglycidylether (DER 331 from Dow), 1.4 g of dicyandiamide (Dyhard 100SH from Alz Chem) and 0.06 g of the tested urea accelerators (UR300 or UR 700 from Alz Chem) are mixed in the speed mixer as described above.

2 g of the described mixtures were put into aluminium cups so that the resulting level of liquid in below 5 mm to prevent overheating due to reaction exotherm. The cups were placed in convection oven and the mixtures were cured for 30 minutes at 180° C. After cooling to room temperature all mixtures are manually evaluated.

To check the stability of the formulation the uncured mixtures were stored in a convection oven at 50° C. Samples were taken from the mixtures on a regular basis and the viscosity was measured using a plate rheometer in oscillation mode at 25° C. A three fold increase in viscosity compared to the result measured before the storage was rated as the limit of shelf life at 50° C.

| Accelerator | Storage time at 50° C. until triple initial viscosity |
|---|---|
| Dyhard UR 300 | 8 days |
| Dyhard UR 700 | 20 days |
| Triethylallylammoniumbromide | >30 days |

Test of Curing Behavior as Sole Hardener

To a suspension of 9 g of a Bisphenol-A-diglycidyether (DER 331 from Dow), 1 g mineral filler (Casiflux A25 from Ankerport n.v.) and 0.5 g of the tested ammonium salt an amount of titanium tetraisopropoxide (Alfa Aesar) equimolar to the ammonium salt was added. The composition was mixed in a vacuum speed mixer (Thinky AVR 310) for one minute at 2000 rpm and a vacuum below 50 mbar.

The reaction exotherm of the mixture was measured via DSC. Multiple portions of the reaction mixtures were cured at various temperatures for 30 minutes each in a convection oven. The resulting exotherm of these samples is again measured via DSC. The percentage of the difference between the total reaction exotherm and the residual exotherm after oven cure compared to the total reaction exotherm is calculated as the degree of cure in percent.

| | Degree of cure after 30 Minutes at the given temperature in ° C. in % | | | | | | | |
|---|---|---|---|---|---|---|---|---|
| | 180 | 170 | 160 | 150 | 140 | 130 | 120 | 110 |
| Triethylallylammoniumbromide | 100 | 100 | 100 | 100 | 100 | 70.6 | 68.7 | 38.3 |
| Triethylbenzylammoniumbromide | 100 | 100 | 100 | 100 | 100 | 91.4 | 90.5 | 72.5 |
| Triethyl-(2-phenylethan-2-on)ammoniumbromide | 100 | 100 | 100 | 100 | 100 | 95.6 | 93.4 | 93.7 |
| Triethyl-(4-nitro-2-phenylethan-2-on)ammoniumbromide | 100 | 100 | 100 | | | | 12.5 | |

-continued

|  | Degree of cure after 30 Minutes at the given temperature in ° C. in % | | | | | | | |
| --- | --- | --- | --- | --- | --- | --- | --- | --- |
|  | 180 | 170 | 160 | 150 | 140 | 130 | 120 | 110 |
| Triethyl-(4-chloro-2-phenylethan-2-on)ammoniumbromide | 100 | 100 | 100 |  | 97 |  | 82 | 75 |
| Triethyl-4-bromobenzylammniumbromide | 100 | 100 | 100 | 100 |  | 82 |  |  |
| Triethyl-4-nitrobenzylammoniumbromide | 100 | 100 | 100 | 95 |  |  | 80 |  |
| Triethyl-(4-crotonic-ethyl-ester)ammoniumbromide | 100 | 100 | 100 | 100 | 100 | 100 | 100 |  |
| Triethyl-(2-acetic-ethyl-ester)ammoniumbromide | 100 | 100 | 100 | 100 | 91 |  | 80 |  |
| Triethylbenzylammonuimhexafluoroantimonate | 100 |  |  | 94 |  |  |  |  |
| Triethylallylammoniumhexafluoroantimonate | 100 |  |  | 92 |  |  |  |  |
| Triethyl-(4-nitro-2-phenylethan-2-on)ammoniumhexafluoroantimonate | 100 |  |  |  |  |  |  |  |
| Triethyl-(4-chloro-2-phenylethan-2-on)ammoniumhexafluoroantimonate | 100 |  |  | 71 |  |  |  |  |
| Triethyl-4-bromobenzylammoniumbromide hexafluoroantimonate | 100 |  |  | 98.2 |  |  |  |  |

What is claimed is:

1. Catalyst composition comprising:
   (a) a base; and
   (b) a quaternary ammonium salt represented by Formula (I):

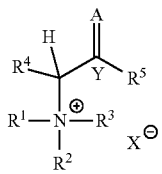

Formula (I)

wherein
$R^1$, $R^2$ and $R^3$ are independently from each other selected from the group consisting of linear or branched, substituted or unsubstituted alkyl with 1 to 20 carbon atoms, linear or branched, substituted or unsubstituted alkenyl with 3 to 20 carbon atoms, linear or branched, substituted or unsubstituted alkoxy with 1 to 20 carbon atoms and substituted or unsubstituted aryl with 6 to 20 carbon atoms; two of $R^1$, $R^2$ and $R^3$ may combine to form together with the nitrogen atom to which they are attached a substituted or unsubstituted 5-to 10-membered ring;

$R^4$ is selected from the group consisting of hydrogen, linear or branched, substituted or unsubstituted alkyl with 1 to 20 carbon atoms, linear or branched, substituted or unsubstituted alkenyl with 3 to 20 carbon atoms and substituted or unsubstituted aryl with 6 to 20 carbon atoms;

Y is C or $N^+$, provided that if Y is $N^+$, A is O and $R^5$ is $O^-$;

A is O or $CR^6R^7$;

$R^5$ is selected from the group consisting of hydrogen, —OH, linear or branched, substituted or unsubstituted alkyl with 1 to 20 carbon atoms, linear or branched, substituted or unsubstituted alkenyl with 3 to 20 carbon atoms, linear or branched, substituted or unsubstituted alkoxy with 1 to 20 carbon atoms, and substituted or unsubstituted aryl with 6 to 20 carbon atoms, or, if Y is $N^+$ and A is O, $R^5$ is $O^-$;

$R^6$ and $R^7$ are independently from each other selected from the group consisting of hydrogen, halogen, nitro, —NRR', cyano, —C(O)R, —C(O)OR, —(CO)NRR', —NR'C(O)R, —OC(O)R, linear or branched, substituted or unsubstituted alkyl with 1 to 20 carbon atoms, linear or branched, substituted or unsubstituted alkenyl with 3 to 20 carbon atoms, linear or branched, substituted or unsubstituted alkoxy with 1 to 20 carbon atoms, and substituted or unsubstituted aryl with 6 to 20 carbon atoms; or $R^5$ and $R^6$ may combine to form together with the carbon atoms to which they are attached a substituted or unsubstituted 5- to 10-membered cycloalkenyl, heteroalicyclic or heteroaryl ring;

R and R' are independently selected from H, alkyl with 1 to 20 carbon atoms, alkenyl with 2 to 20 carbon atoms, alkynyl with 2 to 20 carbon atoms, aryl with 6 to 14 carbon atoms, cycloalk(en)yl with 3 to 8 carbon atoms, 5- to 14-membered heteroaryl, comprising 1 to 4 heteroatoms selected from N, O, and S, and 5- to 14-membered heterocycloalk(en)yl, comprising 1 to 4 heteroatoms selected from N, O, and S; and X is an anion.

2. The catalyst composition according to claim 1, wherein the quaternary ammonium salt is represented by Formula (II)

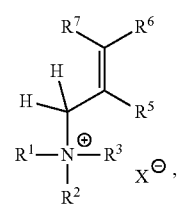

Formula (II)

wherein $R^1$, $R^2$, $R^3$, $R^5$, $R^6$, $R^7$ and X are as defined in claim 1.

3. The catalyst composition according to claim 1, wherein the quaternary ammonium salt is represented by Formula (III):

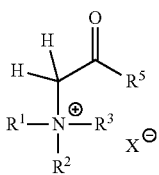

Formula (III)

wherein R¹, R², R³, R⁵ and X are as defined above.

4. The catalyst composition according to claim 1, wherein R¹, R² and/or R³ are methyl or ethyl.

5. The catalyst composition according to claim 1, wherein the anion X is selected from the group consisting of dicyandiamide-anion, F⁻, Cl⁻, Br⁻, I⁻, OH⁻, $HSO_3^-$, $SO_3^{2-}$, $SO_4^{2-}$, $NO_2^-$, $NO_3^-$, $PO_4^{3-}$, $BF_4^-$, $SbF_6^-$, $PF_6^-$, $ClO_4^-$, acetate, citrate, formate, glutarate, lactate, maleate, malonate, oxalate, pyruvate, and tartrate.

6. The catalyst composition according to claim 2 or 3, wherein
 (a) the ammonium compound is a compound represented by Formula (II) wherein R⁵, R⁶ and R⁷ are hydrogen, or R⁵ and R⁷ are hydrogen and R⁶ is —C(O)OR, with R being $C_1$-$C_{20}$ alkyl;
 (b) the ammonium compound is a compound represented by Formula (III) and R⁵ is independently selected from the group consisting of substituted or unsubstituted phenyl or $C_{1-20}$ alkoxy; or
 (c) the ammonium compound is selected from the group consisting triethylallyl ammonium, triethyl (4-crotonic acid ethyl ester)ammonium, triethyl (2-phenylethan-2-one) ammonium, triethyl (4-nitro-2-phenylethan-2-one) ammonium, triethyl (4-chloro-2-phenylethan-2-one) ammonium, and triethyl (2-acetic acid ethyl ester) ammonium, with X being an anion.

7. The catalyst composition according to claim 1, wherein the base is a liquid base and is selected from the group consisting of metal alkoxides, aqueous NaOH, KOH, $Ca(OH)_2$, $Na_2CO_3$, $Na_3PO_4$ and combinations thereof.

8. The catalyst composition according to claim 1, wherein a combination of base and ammonium compound is selected from the group consisting of: triethylallyl ammonium bromide and titanium tetrabutoxide; triethylallyl ammonium bromide and titanium tetraisopropoxide; triethylallyl ammonium bromide and Na methoxylate; triethyl-(2-phenylethan-2-one) ammonium bromide and titanium tetraisopropoxide; triethyl-(4-chloro-2-phenylethan-2-one) ammonium bromide and titanium tetraisopropoxide; triethylallyl ammonium hexafluoroantimonate and titanium tetraisopropoxide; triethyl-(4-chloro-2-phenylethan-2-one) ammonium hexafluoroantimonate and titanium tetraisopropoxide; triethyl-(4-nitro-2-phenylethan-2-one) ammonium hexafluoroantimonate and titanium tetraisopropoxide; triethyl (2-acetic acid ethyl ester)ammonium bromide and titanium tetraisopropoxide; triethyl (2-acetic acid ethyl ester)ammonium hexafluoroantimonate and titanium tetraisopropoxide; triethyl (4-crotonic acid ethyl ester) ammonium bromide and titanium tetraisopropoxide; and triethyl (4-crotonic acid ethyl ester)ammonium hexafluoroantimonate and titanium tetraisopropoxide.

9. The catalyst composition according to claim 1, wherein the catalyst composition further comprises a second curing agent.

10. The catalyst composition according to claim 9, wherein the catalyst composition further comprises an accelerator selected from the group consisting of urea derivatives, imidazole derivatives, and mixtures thereof.

11. A method of curing epoxy resins comprising curing epoxy resins with the catalyst composition according to claim 1, wherein the epoxy resins are selected from the group consisting of diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbiphenol; diglycidyl ethers of alkylene glycols with 2 to 20 carbon atoms and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

12. The method of curing epoxy resins according to claim 11, wherein the epoxy resins are cured at a temperature from about 50 to about 180° C.

13. Adhesive composition comprising the catalyst composition according to claim 1 and at least one epoxy resin, wherein the at least one epoxy resin is selected from the group consisting of diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbiphenol; diglycidyl ethers of alkylene glycols with 2 to 20 carbon atoms and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

\* \* \* \* \*

UNITED STATES PATENT AND TRADEMARK OFFICE
CERTIFICATE OF CORRECTION

PATENT NO. : 10,179,832 B2  
APPLICATION NO. : 15/293864  
DATED : January 15, 2019  
INVENTOR(S) : Christian Holtgrewe et al.

Page 1 of 1

It is certified that error appears in the above-identified patent and that said Letters Patent is hereby corrected as shown below:

In the Specification

Column 2, Line 17, change "heteroalyl" to -- heteroaryl --

Column 11, Line 8, change "Triethyl-4-bromobenzylammniunbromide" to
-- Triethyl-4-bromobenzylammoniunbromide --

Signed and Sealed this
Eighth Day of October, 2019

Andrei Iancu
*Director of the United States Patent and Trademark Office*